Oct. 30, 1951  H. G. BLUMBERG ET AL  2,573,241
COMBINED AUTOMATIC FUEL CONDITIONER
WITH STEAM INJECTION
Filed July 15, 1947   2 SHEETS—SHEET 2
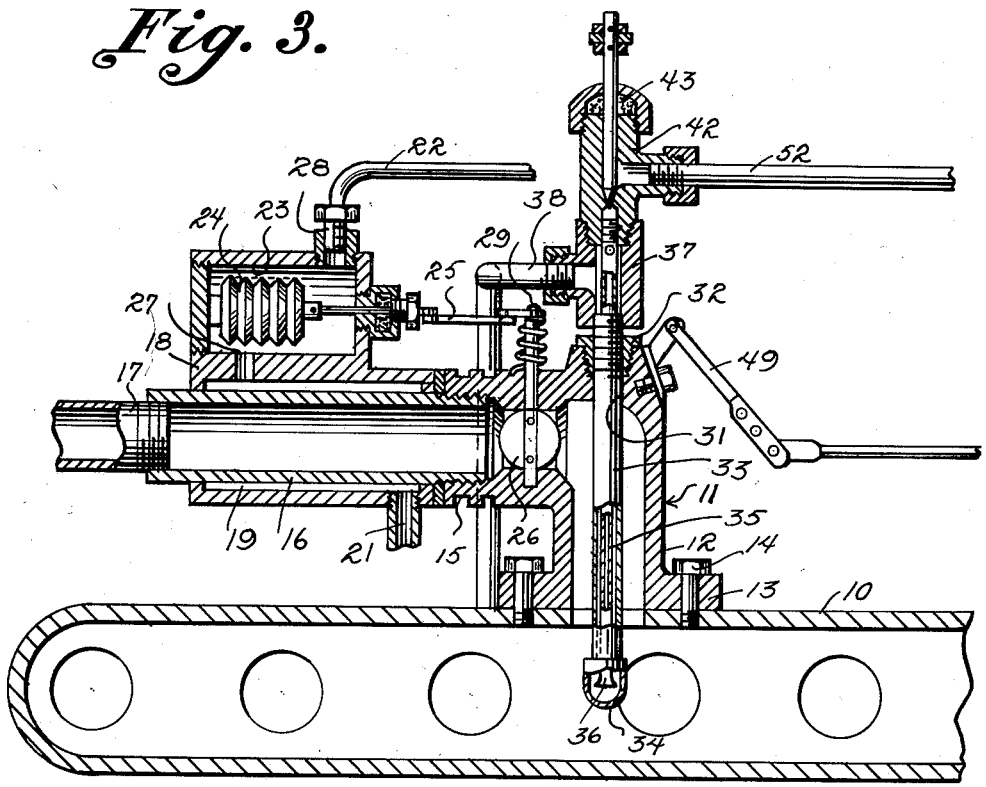
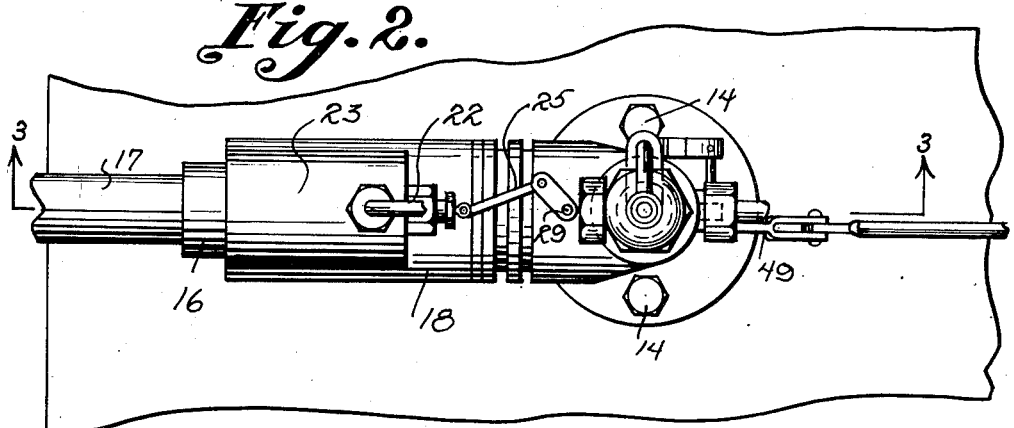
INVENTORS
Hamilton G. Blumberg
Elbert M. Stevens
BY Victor J. Evans & Co.
ATTORNEYS Patented Oct. 30, 1951

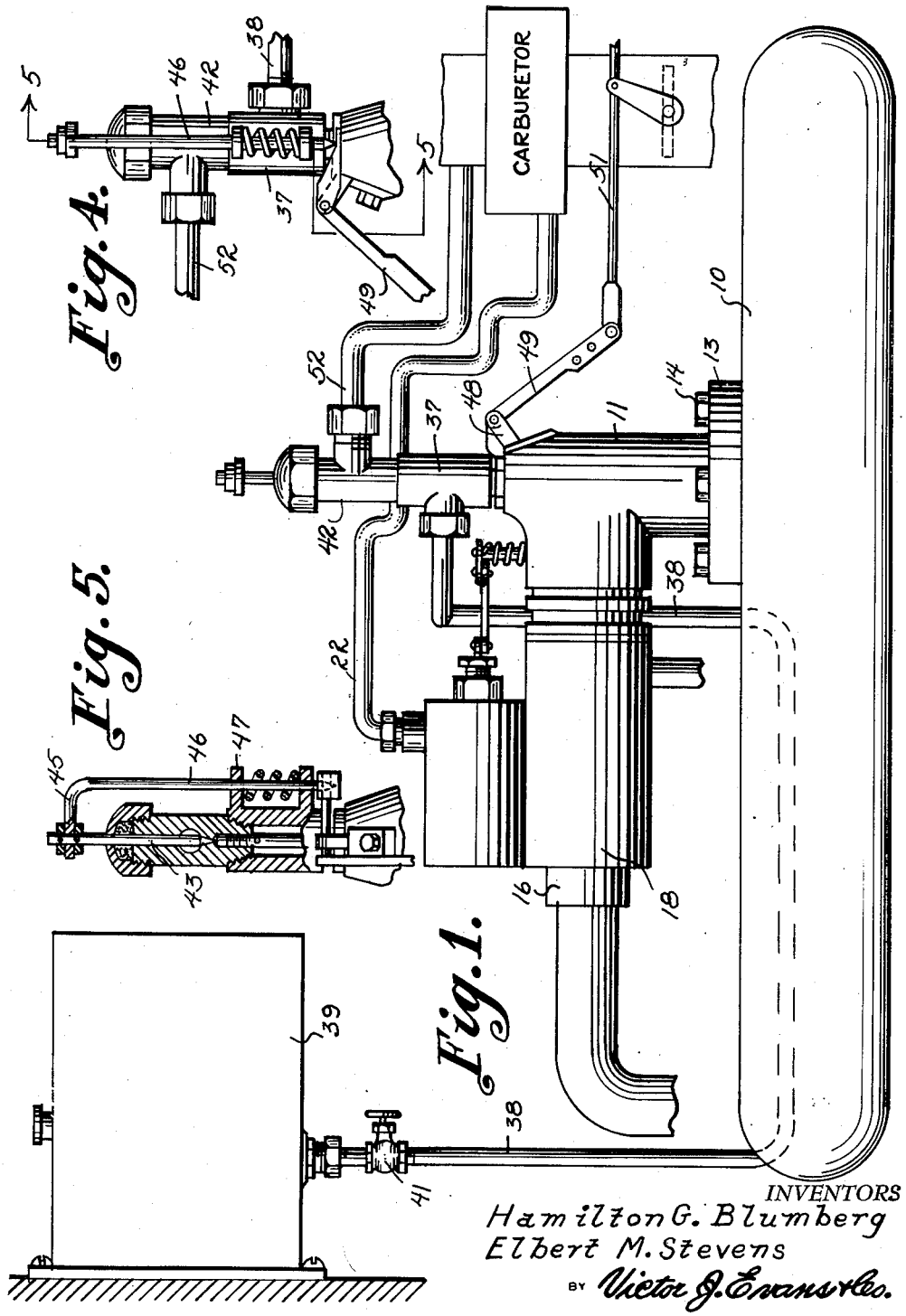

2,573,241

UNITED STATES PATENT OFFICE 2,573,241

COMBINED AUTOMATIC FUEL CONDITIONER WITH STEAM INJECTION

Hamilton G. Blumberg and Elbert M. Stevens, San Antonio, Tex.

Application July 15, 1947, Serial No. 761,060

5 Claims. (Cl. 123—25)

This invention relates to a combined automatic fuel conditioner and steam injection device for internal combustion engines.

It is an object of the present invention to provide a combined fuel conditioner and steam injection device for use with internal combustion engines utilizing low grade fuels whereby to provide a better combustion of the fuel and improve the efficiency of the engine utilizing the same.

It is another object of the present invention to provide a combined conditioner and steam injection device which is adapted to be simply and easily mounted upon an exhaust manifold to receive heat from the exhaust gases for effecting both the generation of steam and preheating of the fuel on traversing the combined device.

Other objects of the present invention are to provide a combined fuel conditioner and steam injection device which is of simple construction, inexpensive to manufacture, simple in operation, easy to install and efficient in operation.

For other objects and for a better understanding of the invention, reference may be had to the following detailed description taken in connection with the accompanying drawing, in which Fig. 1 is a side elevational view of my combined fuel conditioner and steam injection device set up and mounted upon an exhaust manifold and of the fuel supply tank for delivering fuel to the device to be conditioned before being extended to the carburetor of an engine.

Fig. 2 is a top plan view of my device.

Fig. 3 is a longitudinal cross-sectional view of my device taken on line 3—3 of Fig. 2, and looking in the direction of the arrows thereof.

Fig. 4 is a fragmentary and side elevational view of the upper end of my device and looking upon the valve operating mechanism therefor.

Fig. 5 is a cross-sectional view, in elevation, taken on line 5—5 of Fig. 4, and showing the interior of the valve for controlling the flow of the steam to the carburetor.

Referring now to the drawing, 10 represents an exhaust manifold of an internal combustion engine on which my combined fuel conditioner and steam injection device 11 is mounted. My device 11 comprises a casting 12 which has a bottom flange 13 that is attached by screw bolts 14 to the manifold 10. The casting 12 has an internally threaded outlet or sleeve portion 15 to which is attached a sleeve 16 providing a passage through which the exhaust gases, upon entering the casting, will leave the casing and be delivered to an exhaust pipe 17. About the sleeve 16 and abutting with the portion 15 is a casing or housing 18 for providing a heating chamber 19 through which fuel entering inlet pipe 21 to be preheated is extended upon being passed to a fuel supply pipe 22 which may extend to a carburetor of an internal combustion engine. On the casing 18 is a chamber 23 housing a thermostatic device 24 connected through linkage 25 with a butterfly valve 26. The heated fuel upon leaving chamber 19 passes through opening 27 to be delivered to the chamber 23 and then through a fitting 28 for delivery to the pipe 22.

If the device is cold, the butterfly valve 26 will be positioned for maximum flow of exhaust gases through the sleeve 16. As the thermostatic device 24 is expanded the butterfly valve will be positioned to permit less exhaust gases through the sleeve 16. However the movement of the thermostatic device will never completely close the valve 26 to entirely restrict the flow of exhaust gases through the sleeve 16. A spring 29 is provided on the butterfly valve shaft to automatically return the butterfly valve to its normally full open position when the pressure resulting from the expansion of the thermostatic element 24 has been released. By the use of the thermostatic device and the butterfly valve, the fuel leaving the device will be maintained at a substantially constant temperature.

In the top of the casting 12 is an opening 31 threaded at the top to receive a fitting 32 to which is connected a pipe 33 extending downwardly through the casting and provided with a hot bulb or head 34 which extends into the manifold 10 to be heated by exhaust gases. Within the pipe or tube 33 is a steam outlet pipe 35 having a flared lower end 36 for receiving the steam generated in the head 34. On the upper end of the pipe 33 is a T fitting 37 to which is connected a water supply line 38 for delivering water to the device from a supply tank 39 retained on the vehicle at an elevated position. The flow of water through the water supply line 38 is controlled by a valve 41 located in the line near the bottom of the tank 39.

Upon the upper end of the fitting 37 is a valve fitting 42 having a needle valve 43 therein. The central steam outlet pipe 35 is threaded to the valve fitting 42 and is supported therefrom within the pipe 33.

Referring now more particularly to Figs. 4 and 5, there is shown the operating mechanism for adjusting the needle valve 43. On the upper end of the valve 43 there is connected bent arm 45 of a rod 46 adjustable through guide portions 47 on the fitting 37. On the casting 12 is a bracket 48 on which is pivoted a lever 49 having one end engaging with the lower end of rod 46 whereby to lift the same as the lever 49 is pivoted by a control rod 51 connected to the same. By this arrangement the flow of the steam to the carburetor of an engine is controlled. The steam leaves the fitting 42 through a pipe 52.

It should now be apparent that there has been provided in one device a fuel conditioner and a steam injector. The same exhaust gases which generate the steam are used and automatically controlled to bring the temperature of the fuel to a predetermined point.

Having thus set forth and disclosed the nature of our invention, what is claimed is:

1. A combined fuel conditioner and steam injection device comprising a casting adapted to be mounted upon an exhaust chamber of an internal combustion engine, said casting having an outlet portion for the exhaust gases which have traversed the same, a fuel receiving chamber associated with the outlet portion and having inlet and outlet means for receiving the fuel oil to be preheated and for directing the same after it has been heated to a carburetor, a water pipe extending downwardly through the casting to be heated by the gases traversing the same, a central pipe within the water pipe for receiving the steam generated therein, and valve control means for controlling the steam leaving the central pipe.

2. A combined fuel conditioner and steam injection device comprising a casting adapted to be mounted upon an exhaust chamber of an internal combustion engine, said casting having an outlet portion for the exhaust gases which have traversed the same, a fuel receiving chamber associated with the outlet portion and having inlet and outlet means for receiving the fuel oil to be preheated and for directing the same after it has been heated to a carburetor, a water pipe extending downwardly through the casting to be heated by the gases traversing the same, a central pipe within the water pipe for receiving the steam generated therein, and valve control means for controlling the steam leaving the central pipe, and valve means within the outlet portion of the casting for controlling the flow of the exhaust gases through the casting.

3. A combined fuel conditioner and steam injection device as defined in claim 2 and thermostatic means associated with the exhaust control valve and responsive to the temperature of the fuel oil leaving the heating chamber.

4. A combined fuel conditioner and steam injection device comprising a casting adapted to be mounted upon an exhaust chamber of an internal combustion engine, said casting having an outlet portion for the exhaust gases which have traversed the same, a fuel receiving chamber associated with the outlet portion and having inlet and outlet means for receiving the fuel oil to be preheated and for directing the same after it has been heated to a carburetor, a water pipe extending downwardly through the casting to be heated by the gases traversing the same, a central pipe within the water pipe for receiving the steam generated therein, and valve control means for controlling the steam leaving the central pipe, and said water pipe within the casting extending downwardly therethrough and into the exhaust gas chamber, a head provided upon the lower end of the water pipe and said central steam pipe within the water pipe extending downwardly into the head for collecting and receiving the steam generated therein.

5. In a fuel volatilizer for an internal combustion engine having an exhaust manifold and a carburetor, the combination which comprises a housing having a passage therethrough positioned on the exhaust manifold with the said passage communicating with the interior of the manifold, a fuel chamber in the housing positioned around the said passage, a butterfly valve in the said passage, a thermostat in the fuel chamber and connected to the butterfly valve for operating the said valve, a connection from said fuel chamber to the carburetor, a hot bulb providing a steam generator suspended by a tube extended through said passage with the bulb positioned in the exhaust manifold, a connection extended through the exhaust manifold to the hot bulb through the said tube for supplying water to the hot bulb, a steam connection from the hot bulb, through the tube by which the bulb is suspended, to the carburetor, and regulating means in the said steam connection.

HAMILTON G. BLUMBERG.
ELBERT M. STEVENS.

REFERENCES CITED

The following references are of record in the file of this patent:

UNITED STATES PATENTS

| Number | Name | Date |
|---|---|---|
| 1,484,808 | Bartlett | Feb. 26, 1924 |
| 1,587,423 | Rybin | June 1, 1926 |